(12) United States Patent
Johnson

(10) Patent No.: US 12,546,253 B2
(45) Date of Patent: Feb. 10, 2026

(54) METHOD FOR DESIGNING FORMABLE ADDITIVELY MANUFACTURED ACOUSTIC LINERS

(71) Applicant: Raytheon Technologies Corporation, Arlington, VA (US)

(72) Inventor: Jackson David Johnson, Mishawaka, IN (US)

(73) Assignee: RTX Corporation, Arlington, VA (US)

( * ) Notice: Subject to any disclaimer, the term of this patent is extended or adjusted under 35 U.S.C. 154(b) by 291 days.

(21) Appl. No.: 18/328,024

(22) Filed: Jun. 2, 2023

(65) Prior Publication Data

US 2024/0401528 A1    Dec. 5, 2024

(51) Int. Cl.

| | |
|---|---|
| F02C 7/045 | (2006.01) |
| B22F 5/00 | (2006.01) |
| B22F 10/64 | (2021.01) |
| B22F 10/66 | (2021.01) |
| B33Y 10/00 | (2015.01) |
| B33Y 40/20 | (2020.01) |
| B33Y 80/00 | (2015.01) |
| B64D 33/02 | (2006.01) |
| G10K 11/168 | (2006.01) |

(52) U.S. Cl.
CPC .............. *F02C 7/045* (2013.01); *B22F 5/009* (2013.01); *B22F 10/64* (2021.01); *B22F 10/66* (2021.01); *G10K 11/168* (2013.01); *B33Y 10/00* (2014.12); *B33Y 40/20* (2020.01); *B33Y 80/00* (2014.12); *B64D 2033/0206* (2013.01); *F05D 2260/96* (2013.01)

(58) Field of Classification Search
CPC ......... B33Y 10/00; B33Y 80/00; B33Y 40/20; B22F 10/66; B22F 10/64; B22F 5/009; F02C 7/045; B64D 2033/0206; F05D 2260/96; G10K 11/168

See application file for complete search history.

(56) References Cited

U.S. PATENT DOCUMENTS

| | | |
|---|---|---|
| 4,323,614 A | 4/1982 | Gulati |
| 6,871,725 B2 | 3/2005 | Johnson |
| 11,434,819 B2 | 9/2022 | Murugaoppan et al. |

(Continued)

FOREIGN PATENT DOCUMENTS

| | | | |
|---|---|---|---|
| EP | 1125704 A1 | 8/2001 | |
| FR | 3016315 A1 * | 7/2015 | ............ B31D 3/023 |
| WO | WO2021238038 A1 | 12/2021 | |

OTHER PUBLICATIONS

Extended European Search Report dated Oct. 10, 2024, for corresponding European Patent Application No. 24178095.6, 9 pgs.

*Primary Examiner* — Jeremy A Luks
(74) *Attorney, Agent, or Firm* — Kinney & Lange, P.A.

(57) ABSTRACT

A method for forming a curved acoustic liner panel includes additive manufacturing a honeycomb core that includes a plurality of walls. Each wall of the plurality of walls includes a straight base edge at a flat bottom of the honeycomb core and a corrugated top edge opposite the straight base edge. The honeycomb core is heated and placed between a first curved mold and a second curved mold. The honeycomb core is pressed between the first curved mold and the second curved mold to curve the honeycomb core and stretch the corrugated top edge of each wall of the plurality of walls such that the top edge is no longer corrugated.

20 Claims, 5 Drawing Sheets

(56) References Cited

U.S. PATENT DOCUMENTS

2008/0145602 A1* 6/2008 Hendren ............ B29D 99/0089
428/116
2021/0380220 A1 12/2021 Desjoyeaux et al.

* cited by examiner

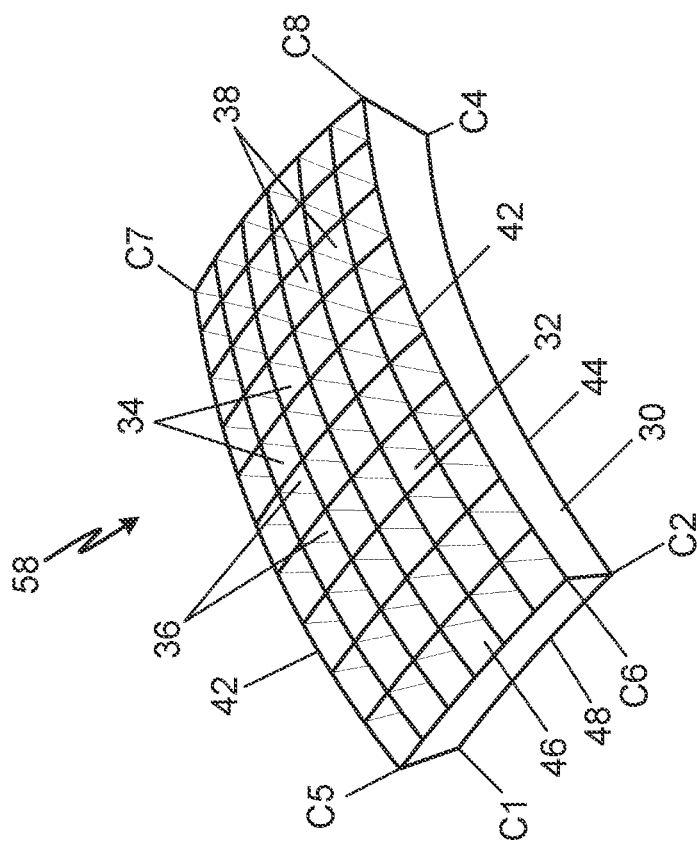
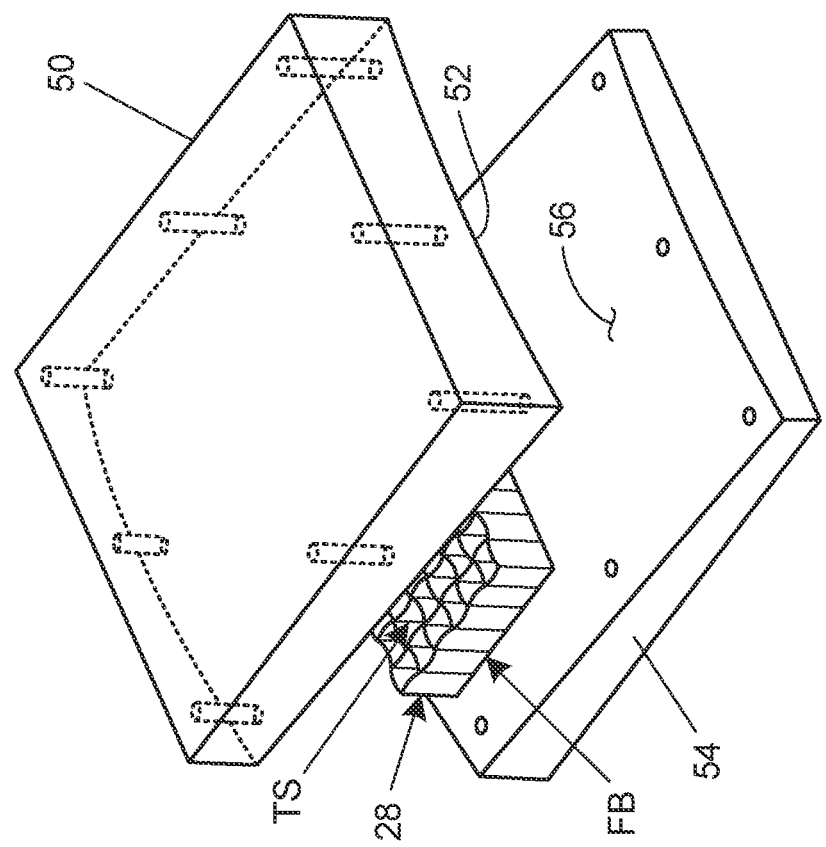
Fig. 3B
Fig. 3A

METHOD FOR DESIGNING FORMABLE ADDITIVELY MANUFACTURED ACOUSTIC LINERS

BACKGROUND

This disclosure relates to gas turbine engines in aircraft, and in particular, to an acoustic liner for reducing emitted noise propagating through a duct of the gas turbine engine.

During operation an aircraft, a gas turbine engine of the aircraft generates noise that requires attenuation and control. Acoustic liners are provided within a flow duct of the gas turbine engine to attenuate the noise generated by the gas turbine engine. Current acoustic liners generally include a honeycomb core and a face sheet attached to the honeycomb core. The honeycomb core is generally made out of aluminum and the face sheet is typically made out of fiberglass or aluminum. The honeycomb core is cut to shape while in a flat sheet then expanded out to form a 3D volume. A drawback of this process is that honeycomb geometries must be fairly simple and straight forward to produce. Using additive manufacturing (AM) polymers allows for the creation of acoustic liners that have more complex geometry that may result in improved acoustic characteristics, lower weight, and less drag. However, most AM parts must be printed in discrete, flat layers, while acoustic liners in an engine are often curved around a center axis the engine. Printing AM acoustic liners in their curved shape leads to all sorts of drawbacks such as excess material used for support, rough surface finishes on the flow facing face sheet, and constraints placed on cell geometry due to cell orientation.

SUMMARY

An acoustic liner panel includes a honeycomb core with a plurality of lengthwise walls extending in a lengthwise direction. Each lengthwise wall of the plurality of lengthwise walls includes a base edge extending straight in the lengthwise direction and a top edge extending in a wavy pattern in the lengthwise direction, with the top edge being greater in length than the base edge. The honeycomb core also includes a plurality of widthwise walls extending in a widthwise direction. The plurality of widthwise walls intersects the plurality of lengthwise walls. Each widthwise wall of the plurality of widthwise walls includes a base edge extending straight in the widthwise direction and a top edge extending in a wavy pattern in the widthwise direction, with the top edge being greater in length than the base edge. A plurality of cells is formed by the plurality of lengthwise walls and the plurality of widthwise walls. Upon forming the honeycomb core into a curved acoustic liner panel, the top edges of both the lengthwise walls and the widthwise walls are stretched to substantially eliminate the wavy patterns in the top edges of both the lengthwise walls and the widthwise walls.

In a further embodiment of any of the foregoing embodiments, a flat face sheet connected to the base edge of each lengthwise wall of the plurality of lengthwise walls and connected to the base edge of each widthwise wall of the plurality of widthwise walls.

In a further embodiment of any of the foregoing embodiments, the wavy pattern of the top edge of each lengthwise wall of the plurality of lengthwise walls includes a wavelength extending in the lengthwise direction and an amplitude extending in the widthwise direction, and the top edge of each widthwise wall of the plurality of widthwise walls includes a wavelength extending in the widthwise direction and an amplitude extending in the widthwise direction.

In a further embodiment of any of the foregoing embodiments, the wavy pattern of the top edge of each lengthwise wall of the plurality of lengthwise walls is out of phase with the top edge of an adjacent lengthwise wall of the plurality of lengthwise walls.

In a further embodiment of any of the foregoing embodiments, the wavy pattern of the top edge of each widthwise wall of the plurality of widthwise walls is out of phase with the top edge of an adjacent widthwise wall of the plurality of widthwise walls.

In a further embodiment of any of the foregoing embodiments, a depth of the plurality of cells changes in the widthwise direction.

In a further embodiment of any of the foregoing embodiments, a first lengthwise wall of the plurality of lengthwise walls includes a height different from a height of a second lengthwise wall of the plurality of lengthwise walls.

In a further embodiment of any of the foregoing embodiments, a first lengthwise wall of the plurality of lengthwise walls includes a top edge with a wavy pattern that differs in amplitude from a wavy pattern of a top edge of a second lengthwise wall of the plurality of lengthwise walls.

A method is disclosed for forming a curved acoustic liner panel by additive manufacturing the honeycomb core of any of the foregoing embodiments. The method includes placing the honeycomb core between a first curved mold and a second curved mold. The honeycomb core is heated and pressed between the first curved mold and the second curved mold to curve the honeycomb core and stretch the wavy pattern of the top edge of each lengthwise wall of the plurality of lengthwise walls. The honeycomb core is also pressed between the first curved mold and the second curved mold to stretch the wavy pattern of the top edge of each widthwise wall of the plurality of widthwise walls.

In a further embodiment of any of the foregoing embodiments, heating the first curved mold and the second curved mold at the same time as the heating of the honeycomb core.

In a further embodiment of any of the foregoing embodiments, heating the honeycomb core to a glass transition temperature of a material of the honeycomb core.

In a further embodiment of any of the foregoing embodiments, additive manufacturing a flat face sheet; and additive manufacturing the honeycomb core onto the flat face sheet.

In a further embodiment of any of the foregoing embodiments, connecting a second face sheet to the top edge of each lengthwise wall of the plurality of lengthwise walls and to the top edge of each widthwise wall of the plurality of widthwise walls.

A honeycomb core includes a first plurality of walls extending in a first direction and a second plurality of walls extending in a second direction. The second plurality of walls intersects the first plurality of walls to form a plurality of cells. Each wall of the first plurality of walls includes a base edge at a flat bottom of the honeycomb core that extends straight in the first direction and a top edge spaced from the base edge in a height-wise direction that extends in a wavy pattern in the first direction. Each wall of the second plurality of walls includes a base edge at the flat bottom of the honeycomb core that extends straight in the second direction and a top edge spaced from the base edge of the wall of the second plurality of walls that extends in a wavy pattern in the second direction.

In a further embodiment of any of the foregoing embodiments, a face sheet at the flat bottom of the honeycomb core and integral with the first plurality of walls and the second plurality of walls.

In a further embodiment of any of the foregoing embodiments, each cell of the plurality of cells includes a rectangular profile at the flat bottom of the honeycomb core.

In a further embodiment of any of the foregoing embodiments, each cell of the plurality of cells transitions in the height-wise direction from the rectangular profile to a second profile, wherein the second profile includes: a first concave side opposite a second concave side; and a first convex side opposite a second convex side.

In a further embodiment of any of the foregoing embodiments, the plurality of cells changes in height in the second direction.

In a further embodiment of any of the foregoing embodiments, a first wall of the first plurality of walls includes a top edge with a wavy pattern that differs in amplitude from a wavy pattern of a top edge of a second wall of the first plurality of walls.

A method for forming a curved acoustic liner panel includes additive manufacturing a honeycomb core that includes a plurality of walls. Each wall of the plurality of walls includes a straight base edge at a flat bottom of the honeycomb core and a corrugated top edge opposite the straight base edge. The honeycomb core is placed between a first curved mold and a second curved mold. The honeycomb core, the first curved mold, and the second curved mold are heated. The honeycomb core is pressed between the first curved mold and the second curved mold to curve the honeycomb core and stretch the corrugated top edge of each wall of the plurality of walls such that the top edge is no longer corrugated.

The present summary is provided only by way of example, and not limitation. Other aspects of the present disclosure will be appreciated in view of the entirety of the present disclosure, including the entire text, claims and accompanying figures.

BRIEF DESCRIPTION OF THE DRAWINGS

FIG. 3A is a perspective view of the flat acoustic liner panel from FIG. 2 placed in a curved mold.

FIG. 3B is a perspective view of a curved acoustic liner panel formed from the flat acoustic liner panel and curved mold from FIG. 2.

Figure 1:
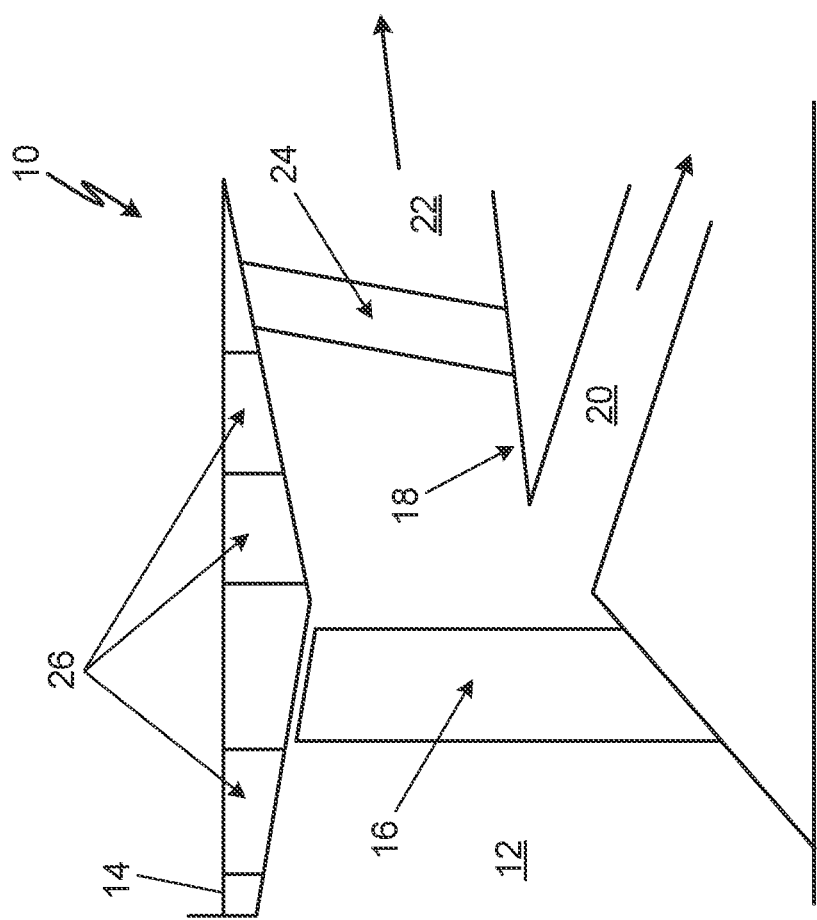
FIG. 1 is a cross-sectional side view of a fan section of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A method is disclosed for forming a curved acoustic liner panel using an initially flat and additively manufactured honeycomb core. The honeycomb core includes a plurality of walls forming a plurality of cells. Initially, the honeycomb core is additive manufactured such that the honeycomb core has a flat bottom and each wall of the plurality of walls has a base edge that is substantially straight and a top edge that is corrugated with a wavy pattern. The honeycomb core is placed between two curved molds and heated. The heated honeycomb core is pressed between the two curved molds to curve the honeycomb core. As the honeycomb core is pressed and curved between the two curved molds, the top edge of each wall of the plurality of walls is elongated and stretched such that the top edge is no longer corrugated or wavy. The honeycomb core and the method of forming the curved acoustic liner are described in detail below with reference to FIGS. 1-5.

FIG. 1 is a cross-sectional side view of fan section 12 of gas turbine engine 10. As shown in FIG. 1, gas turbine engine 10 can be a high bypass turbofan engine that includes fan section 12, fan case 14, fan blades 16, core case 18, core passage 20, bypass duct 22, fan exit guide vanes (FEGV) 24, and acoustic liners 26. Fan blades 16 rotate within fan case 14 to pull air into gas turbine engine 10 and push the air past FEGV 24 and into bypass duct 22. A portion of the air flowing into gas turbine engine 10 is directed into core passage 20 for compression and combustion by gas turbine engine 10. Core case 18 surrounds an entrance to core passage 20 and separates bypass duct 22 from core passage 20.

Acoustic liners 26 are connected to fan case 14 and are positioned upstream and downstream from fan blades 16. As fan blades 16 rotate and pull air into fan section 12 of gas turbine engine 10, fan blades 16 and the flowing air can generate noise. Acoustic liners 26 attenuate and dampen the noise generated by fan blades 16 and the air flowing through fan section 12. While FIG. 1 only shows acoustic liners 26 on fan case 14 of fan section 12, acoustic liners 26 can also be included on core case 18 and inside bypass duct 22, or in any location of gas turbine engine 10 that requires noise attenuation. As discussed in greater detail below with reference to FIGS. 2-5, each of acoustic liners 26 includes an assembly of panels, with each panel including a perforated face sheet covering a honeycomb core. As the flow passages within gas turbine engine 10 are annular, the honeycomb core and the face sheet of each panel of acoustic liners 26 must also be curved.

Noise and acoustics can vary by position inside fan section 12. The honeycomb core of acoustic liners 26 can include cells that vary in size, depth, and geometry to target and attenuate different frequencies. Additive manufacturing the honeycomb core of acoustic liners 26 allows the honeycomb core to have a complex geometry that results in improved acoustic, weight, and drag characteristics over honeycomb cores in past acoustic liners. Additive manufacturing processes include the ability to produce highly complex parts quickly and efficiently, and to modify design specifications of the desired part, for example by modifying CAD specifications, without re-tooling casting or machining equipment used for traditional, subtractive manufacturing processes. Additive manufacturing allows complex design features to be incorporated into parts where those complex design features had proved infeasible using previous manufacturing techniques.

Additive manufacturing generally involves printing a part layer by layer. Additive manufacturing a part with curvature does have several drawbacks. Additive manufacturing a part with curved surfaces often requires additional material and structures to support the curved surfaces. Additive manufacturing a curved surface can also impart a rough and stepped surface finish to the curved surface. Cell geometry can also be constrained when additive manufacturing a curved honeycomb core due to cell orientation in the curved honeycomb core. As discussed below with reference to FIGS. 2 and 3, the problems involved with additive manufacturing a curved honeycomb core are avoided by forming the panels of acoustic liners 26 from a honeycomb core that is additive manufactured with a flat bottom.

Figure 2:
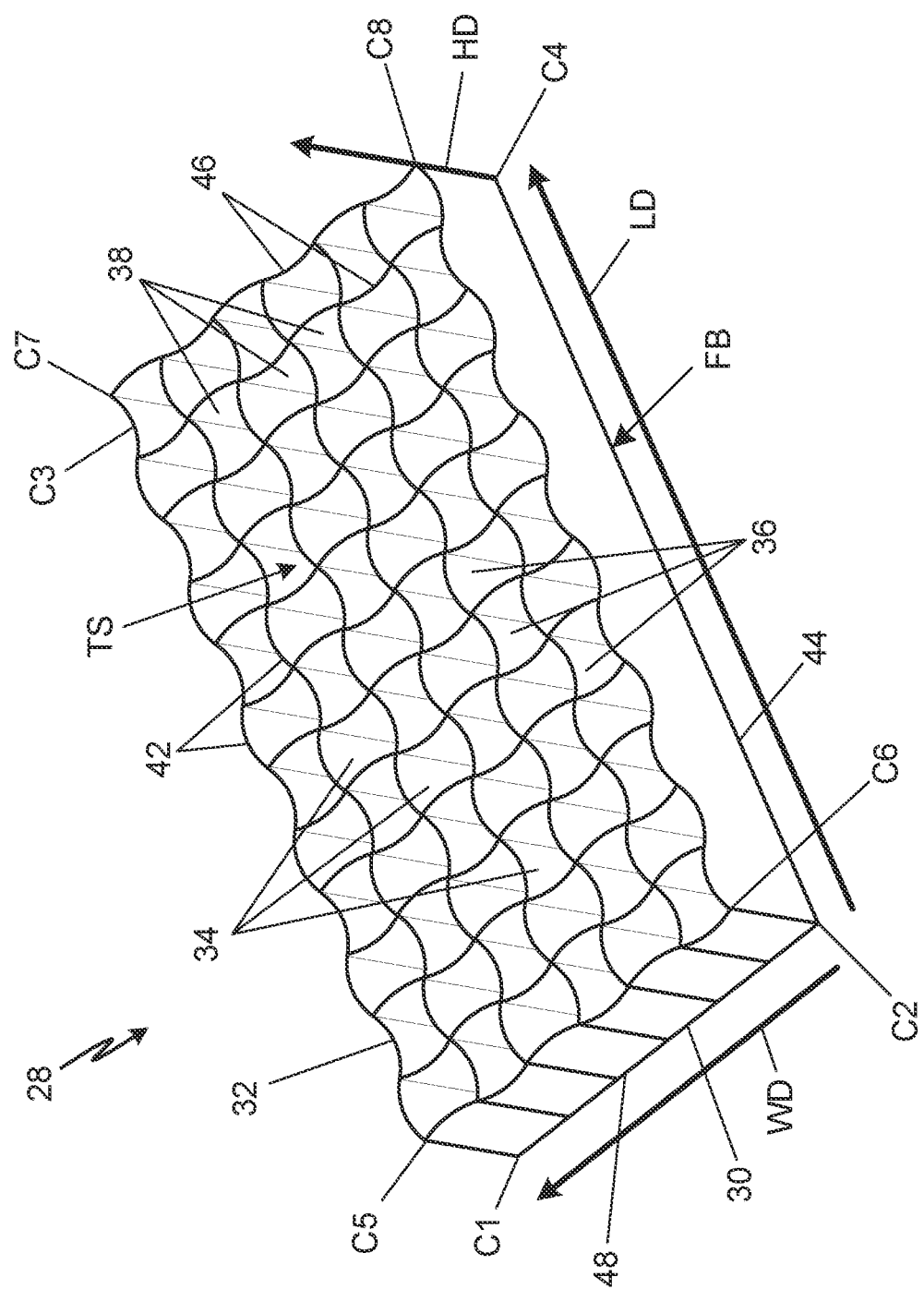
FIG. 2 is a perspective view of a flat acoustic liner panel formed by additive manufacturing.

FIG. 2 is a perspective view of acoustic liner panel 28 formed by additive manufacturing. As shown in FIG. 2, acoustic liner panel 28 is generally rectangular with flat bottom FB, top side TS, first corner C1, second corner C2, third corner C3, fourth corner C4, fifth corner C5, sixth corner C6, seventh corner C7, and eighth corner C8. Acoustic liner panel 28 includes face sheet 30 and honeycomb core 32. Honeycomb core 32 includes a first plurality of walls 34, a second plurality of walls 36, and a plurality of cells 38. Each wall 34 of the first plurality of walls 34 extends in a lengthwise direction LD and includes top edge 42 and base edge 44. Each wall of the second plurality of walls 36 extends in a widthwise direction WD and includes top edge 46 and base edge 48. The first plurality of walls 34 and the second plurality of walls 36 both extend from face sheet 30 in a height-wise direction HD.

First corner C1, second corner C2, third corner C3, and fourth corner C4 are the corners of flat bottom FB of acoustic liner panel 28. Fifth corner C5, sixth corner C6, seventh corner C7, and eighth corner C8 are the corners of top side TS of acoustic liner panel 28. Face sheet 30 is flat and forms flat bottom FB of acoustic liner panel 28. The first plurality of walls 34 includes lengthwise walls 34 that extend in the lengthwise direction LD. The second plurality of walls 36 includes widthwise walls 36 that extend in the widthwise direction WD and intersect the first plurality of walls 34 to form the plurality of cells 38. The first plurality of walls 34 and the second plurality of walls 36 are integral with face sheet 30 and both the first plurality of walls 34 and the second plurality of walls 36 extend from face sheet 30 in the height-wise direction HD to define a depth or height of each cell 38. When acoustic liner panel 28 is additive manufactured, the height-wise direction HD is the build direction of acoustic liner panel 28. Flat face sheet 30 is formed first, followed by honeycomb core 32. Since face sheet 30 is flat and honeycomb core 32 extends vertically up from face sheet 30, no support structure is needed to additive manufacture acoustic liner panel 28 and there are fewer constraints on the geometry of cells 38. Acoustic liner panel 28 can be additive manufactured from a polymer lighter than aluminum. In other examples, acoustic liner panel 28 can be additive manufactured from metal using a powder bed additive manufacturing process.

Base edge 44 of each wall 34 of the first plurality of walls 34 is connected to face sheet 30 and extends straight in the lengthwise direction LD. Top edge 42 of each wall 34 of the first plurality of walls 34 is spaced from base edge 44 in the height-wise direction HD and extends in a wavy pattern in the lengthwise direction LD such that top edge 42 is corrugated. The wavy pattern of top edge 42 of each wall 34 of the first plurality of walls 34 has a wavelength extending in the lengthwise direction LD and an amplitude extending in the widthwise direction WD. The wavy pattern of top edge 42 can be sinusoidal, a spline, a series of tangent arcs, or even a series of angled straight lines. Each of walls 34 of the first plurality of walls 34 transitions from straight base edge 44 to wavy and corrugated top edge 42. While fifth corner C5 and seventh corner C7 of acoustic liner panel 28 can be spaced from each other in the lengthwise direction LD approximately the same distance that first corner C1 is spaced from third corner C3 in the lengthwise direction LD, top edge 42 of each wall 34 of the first plurality of walls 34 is greater in length than the length of base edge 44 if top edge 42 is stretched and straightened out. In similar fashion, while sixth corner C6 and eighth corner C8 of acoustic liner panel 28 can be spaced from each other in the lengthwise direction LD approximately the same distance that second corner C2 is spaced from fourth corner C4 in the lengthwise direction LD, top edge 42 of each wall 34 of the first plurality of walls 34 is greater in length than the length of base edge 44 if top edge 42 is stretched and straightened out.

Base edge 48 of each wall 36 of the second plurality of walls 36 is connected to face sheet 30 and extends straight in the widthwise direction WD. Top edge 46 of each wall 36 of the second plurality of walls 36 is spaced from base edge 48 in the height-wise direction HD and extends in a wavy pattern in the widthwise direction WD such that top edge 46 is corrugated. The wavy pattern of top edge 46 of each wall 36 of the second plurality of walls 36 has a wavelength extending in the widthwise direction WD and an amplitude extending in the lengthwise direction LD. The wavy pattern of top edge 46 can be sinusoidal, a spline, a series of tangent arcs, or even a series of angled straight lines. Each of walls 36 of the second plurality of walls 36 transitions from straight base edge 48 to wavy and corrugated top edge 46. While fifth corner C5 and sixth corner C6 of acoustic liner panel 28 can be spaced from each other in the widthwise direction WD approximately the same distance that first corner C1 is spaced from second corner C2 in the widthwise direction WD, top edge 46 of each wall 36 of the second plurality of walls 36 is greater in length than the length of base edge 48 when top edge 46 is straightened out. In similar fashion, while seventh corner C7 and eighth corner C8 of acoustic liner panel 28 can be spaced from each other in the widthwise direction WD approximately the same distance that third corner C3 is spaced from fourth corner C4 in the widthwise wise direction WD, top edge 46 of each wall 36 of the second plurality of walls 36 is greater in length than the length of base edge 48 when top edge 46 is straightened out.

In the example of FIG. 2, since base edge 44 of each wall 34 of the first plurality of walls 34 extends straight in the lengthwise direction LD, and since base edge 48 of each wall 36 of the second plurality of walls 36 extends straight in the widthwise direction WD, each of cells 38 comprises a rectangular profile (not visible) adjacent to flat bottom FB. Rectangular profile should be interpreted herein to also include profiles that are square and parallelogram in shape. As each cell 38 extends in the height-wise direction from flat base FB formed by face sheet 30 toward top side TS, each cell 38 transitions from the rectangular profile to a second profile. The second profile of each cell 38, as shown in FIG. 2, includes a first concave side opposite a second concave side, and a first convex side opposite a second convex side. The second profile shown in FIG. 2 can be produced by forming the wavy profile of top edge 42 of each wall 34 of the first plurality of walls 34 to be out of phase with the wavy profile of top edge 42 of each adjacent wall 34, and by forming the wavy profile of top edge 46 of each wall 36 of the second plurality of walls 36 to be out of phase with the wavy profile of top edge 46 of each adjacent wall 36.

The first plurality of walls 34 and the second plurality of walls 36 can be additive manufactured to vary in height such that cells 38 can vary in depth or height in the widthwise direction WD and/or the lengthwise direction LD. For example, a first wall of the first plurality of walls 34 can include a height different from a height of a second wall of the first plurality of walls 34. Top edge 42 of each wall 34 of the first plurality of walls 34 can have a wavy pattern that differs in amplitude from the rest of walls 34 of the first plurality of walls 34 such that each top edge 42 will have a different length when curved and stretched, allowing acoustic liner panel 28 to form curved and tapering acoustic liners 26. Once acoustic liner panel 28 is additively formed, acoustic liner panel 28 with flat bottom FB is further processed to form curved acoustic liner panel 58 as described in detail below with reference to FIGS. 3A and 3B.

FIGS. 3A and 3B will be discussed concurrently. FIG. 3A is a perspective view of acoustic liner panel 28 with flat bottom FB from FIG. 2 placed between first curved mold 50 with concave face 52 and second curved mold 54 with convex face 56 used to modify the acoustic liner panel 28 into curved acoustic liner panel 58, shown in FIG. 3B. After acoustic liner panel 28 from FIG. 2 is formed, acoustic liner panel 28 is placed between first curved mold 50 and second curved mold 54 with flat bottom FB of acoustic liner panel 28 facing convex face 56 and top side TS of acoustic liner panel 28 facing concave face 52. Acoustic liner panel 28, first curved mold 50, and second curved mold 54 are then heated together at the same time to a glass transition temperature of the polymer or metal forming acoustic liner panel 28. In other examples, first curved mold 50 and second curved mold 54 are not heated, or are heated separate from acoustic liner panel 28, and acoustic liner panel 28 is heated to the glass transition temperature of the polymer or metal forming acoustic liner panel 28 before acoustic liner panel 28 is placed between first curved mold 50 and second curved mold 54.

After acoustic liner panel 28 is heated to the glass transition temperature, acoustic liner panel 28 is pressed between concave face 52 of first curved mold 50 and convex face 56 of second curved mold 54 to form curved acoustic liner panel 58. As acoustic liner panel 28 is pressed between first curved mold 50 and second curved mold 54 to form curved acoustic liner panel 58, face sheet 30 is curved into a concave shape and top edge 42 of each wall 34 of the first plurality of walls 34 is stretched to substantially eliminate the wavy pattern of top edge 42 such that top edge 42 is no longer corrugated. Top edge 46 of each wall 36 of the second plurality of walls 36 is also curved and stretched to substantially eliminate the wavy pattern of top edge 46 such that the top edge 46 is no longer corrugated. Once acoustic liner panel 28 has been pressed and shaped into curved acoustic liner panel 58 by first curved mold 50 and second curved mold 54, each cell 38 includes a rectangular profile through an entire depth or height of cell 38. While FIGS. 2-3B describe cells 38 as having a rectangular profile, in other examples, cells 38 can have a profile that is triangular or hexagonal.

Figure 4:
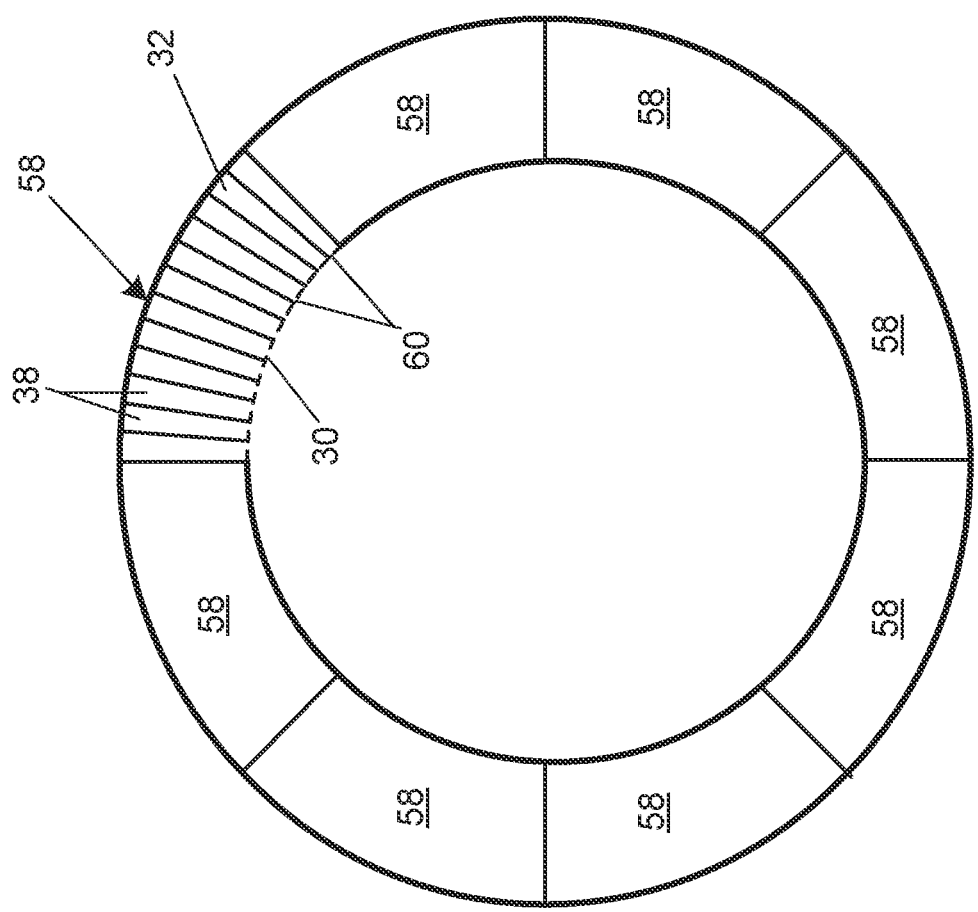
FIG. 4 is a cross-sectional view of an acoustic liner assembly forming an outer diameter flow surface.

FIG. 4 is a cross-sectional view of multiple curved acoustic liner panels 58 from FIG. 3 assembled into an acoustic liner assembly forming an outer diameter flow surface. As shown in FIG. 4, face sheet 30 of each acoustic liner panel 58 forms the outer diameter flow surface. Perforations 60 are formed in face sheet 30 before acoustic liner panel 28 is formed into curved acoustic liner panel 58 or after acoustic liner panel 28 is formed into curved acoustic liner panel 58. Perforations 60 allow fluid communication between the cells 38 of honeycomb core 32 and the air flow passage surrounded by curved acoustic liner panels 58.

Figure 5:
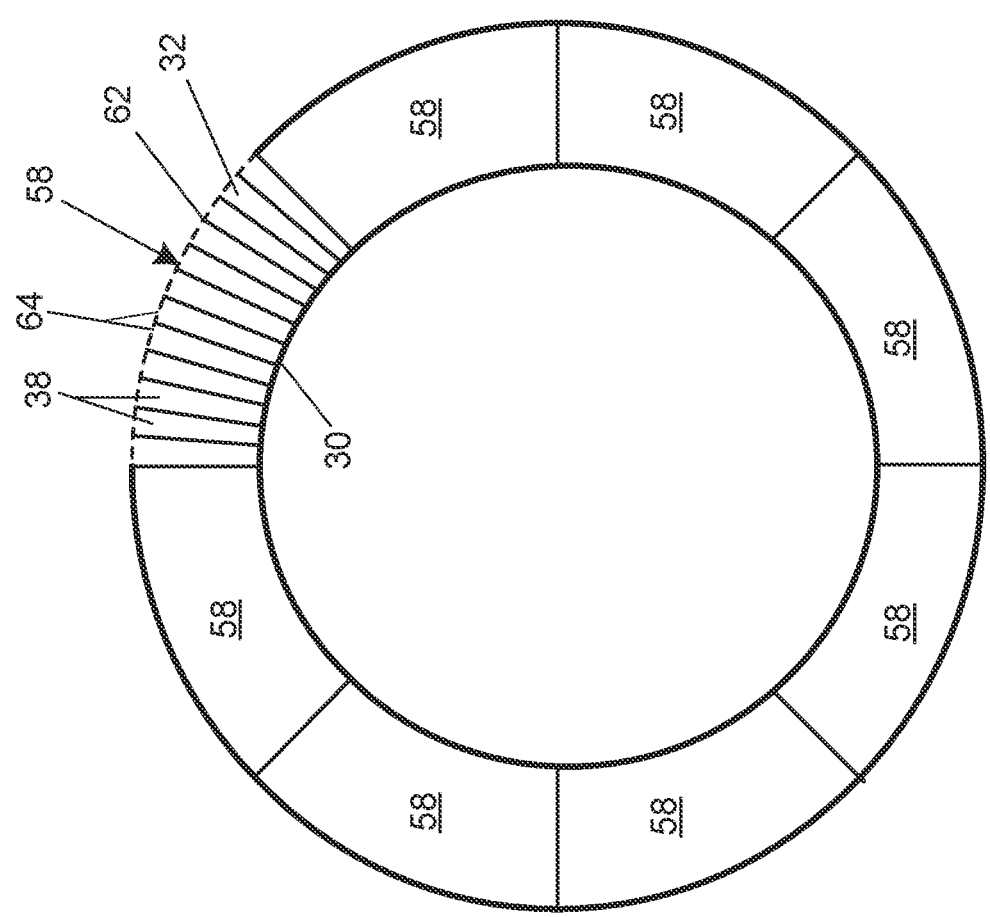
FIG. 5 is a cross-sectional view of an acoustic liner assembly forming an inner diameter flow surface.

FIG. 5 is a cross-sectional view of multiple curved acoustic liner panels 58 from FIG. 3 assembled into an acoustic liner assembly forming an outer diameter flow surface. In the example of FIG. 5, second face sheet 62 is connected to top edge 42 of each wall 34 of the second plurality of walls 34 and to top edge 46 of each wall 36 of the second plurality of walls 36 after curved acoustic liner panel 58 is formed from acoustic liner panel 28. Second face sheet 62 is convex and forms the inner diameter flow surface. Perforations 64 are formed in second face sheet 62 and allow fluid communication between the cells 38 of honeycomb core 32 with the air flow passage surrounding curved acoustic liner panels 58 of FIG. 5.

As discussed above with reference to the figures, the disclosed apparatus and method provides acoustic liner panel 28 that can be additively manufactured as an initially flat structure and subsequently processed to form a curved acoustic liner in a gas turbine engine. Because acoustic liner panel 28 can be additively manufactured, acoustic liner panel can take advantage of the benefits of additive manufacturing (complex geometries, lighter-weight materials, reduce manufacturing steps) while also avoiding the disadvantages common to curved parts formed through additive manufacturing (increased material requirements, rough surface finish, and geometric constraints on honeycomb cells).

While the invention has been described with reference to an exemplary embodiment(s), it will be understood by those skilled in the art that various changes may be made and equivalents may be substituted for elements thereof without departing from the scope of the invention. For example, while FIGS. 2-3B describe cells 38 of honeycomb core 32 as having a rectangular profile, cells 38 can have a profile that is triangular or hexagonal. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An acoustic liner panel comprising:
   a honeycomb core comprising:
   a plurality of lengthwise walls extending in a lengthwise direction, wherein each lengthwise wall of the plurality of lengthwise walls comprises:
   a base edge extending straight in the lengthwise direction; and
     a top edge extending in a wavy pattern in the lengthwise direction, wherein the top edge is greater in length than the base edge;
   a plurality of widthwise walls extending in a widthwise direction, wherein the plurality of widthwise walls intersects the plurality of lengthwise walls, and wherein each widthwise wall of the plurality of widthwise walls comprises:
   a base edge extending straight in the widthwise direction; and
     a top edge extending in a wavy pattern in the widthwise direction, wherein the top edge is greater in length than the base edge; and a plurality of cells formed by the plurality of lengthwise walls and the plurality of widthwise walls, wherein upon forming said honeycomb core into a curved acoustic liner panel, the top edges of both the lengthwise walls and the widthwise walls are stretched to substantially eliminate the wavy patterns in the top edges of both the lengthwise walls and the widthwise walls.

2. The acoustic liner panel of claim 1, further comprising:
a flat face sheet connected to the base edge of each lengthwise wall of the plurality of lengthwise walls and connected to the base edge of each widthwise wall of the plurality of widthwise walls.

3. The acoustic liner panel of claim 2, wherein:
the wavy pattern of the top edge of each lengthwise wall of the plurality of lengthwise walls comprises a wavelength extending in the lengthwise direction and an amplitude extending in the widthwise direction, and
the top edge of each widthwise wall of the plurality of widthwise walls comprises a wavelength extending in the widthwise direction and an amplitude extending in the widthwise direction.

4. The acoustic liner panel of claim 3, wherein the wavy pattern of the top edge of each lengthwise wall of the plurality of lengthwise walls is out of phase with the top edge of an adjacent lengthwise wall of the plurality of lengthwise walls.

5. The acoustic liner panel of claim 4, wherein the wavy pattern of the top edge of each widthwise wall of the plurality of widthwise walls is out of phase with the top edge of an adjacent widthwise wall of the plurality of widthwise walls.

6. The acoustic liner panel of claim 1, wherein a depth of the plurality of cells changes in the widthwise direction.

7. The acoustic liner panel of claim 1, wherein a first lengthwise wall of the plurality of lengthwise walls comprises a height different from a height of a second lengthwise wall of the plurality of lengthwise walls.

8. The acoustic liner panel of claim 1, wherein a first lengthwise wall of the plurality of lengthwise walls comprises a top edge with a wavy pattern that differs in amplitude from a wavy pattern of a top edge of a second lengthwise wall of the plurality of lengthwise walls.

9. A method for forming a curved acoustic liner panel comprises:
additive manufacturing the honeycomb core of claim 1;
placing the honeycomb core between a first curved mold and a second curved mold;
heating the honeycomb core;
pressing the honeycomb core between the first curved mold and the second curved mold to curve the honeycomb core and stretch the wavy pattern of the top edge of each lengthwise wall of the plurality of lengthwise walls;
pressing the honeycomb core between the first curved mold and the second curved mold to stretch the wavy pattern of the top edge of each widthwise wall of the plurality of widthwise walls.

10. The method of claim 9, further comprising:
heating the first curved mold and the second curved mold at the same time as the heating of the honeycomb core.

11. The method of claim 9, further comprising:
heating the honeycomb core to a glass transition temperature of a material of the honeycomb core.

12. The method of claim 9, further comprising:
additive manufacturing a flat face sheet; and
additive manufacturing the honeycomb core onto the flat face sheet.

13. The method of claim 9, further comprising:
connecting a second face sheet to the top edge of each lengthwise wall of the plurality of lengthwise walls and to the top edge of each widthwise wall of the plurality of widthwise walls.

14. A honeycomb core comprises:
a first plurality of walls extending in a first direction, wherein each wall of the first plurality of walls comprises:
a base edge at a flat bottom of the honeycomb core and extending straight in the first direction; and
a top edge spaced from the base edge in a height-wise direction and extending in a wavy pattern in the first direction; and
a second plurality of walls extending in a second direction, wherein the second plurality of walls intersects the first plurality of walls to form a plurality of cells, and wherein each wall of the second plurality of walls comprises:
a base edge at the flat bottom of the honeycomb core extending straight in the second direction; and
a top edge spaced from the base edge of the wall of the second plurality of walls and extending in a wavy pattern in the second direction, and
wherein the honeycomb core is curved by stretching the top edges of both the first plurality of walls and the second plurality of walls to substantially eliminate the wavy patterns in the top edges of both the first plurality of walls and the second plurality of walls.

15. The honeycomb core of claim 14, further comprising:
a face sheet at the flat bottom of the honeycomb core and integral with the first plurality of walls and the second plurality of walls.

16. The honeycomb core of claim 14, wherein each cell of the plurality of cells comprises a rectangular profile at the flat bottom of the honeycomb core.

17. The honeycomb core of claim 16, wherein each cell of the plurality of cells transitions in the height-wise direction from the rectangular profile to a second profile, wherein the second profile comprises:
a first concave side opposite a second concave side; and
a first convex side opposite a second convex side.

18. The honeycomb core of claim 17, wherein the plurality of cells changes in height in the second direction.

19. The honeycomb core of claim 18, wherein a first wall of the first plurality of walls comprises a top edge with a wavy pattern that differs in amplitude from a wavy pattern of a top edge of a second wall of the first plurality of walls.

20. A method for forming a curved acoustic liner panel comprises:
additive manufacturing a honeycomb core, wherein the honeycomb core comprises a plurality of walls, wherein each wall of the plurality of walls comprises a straight base edge at a flat bottom of the honeycomb core and a corrugated top edge opposite the straight base edge;
placing the honeycomb core between a first curved mold and a second curved mold;
heating the honeycomb core, the first curved mold, and the second curved mold; and
pressing the honeycomb core between the first curved mold and the second curved mold to curve the honeycomb core and stretch the corrugated top edge of each wall of the plurality of walls such that the top edge is no longer corrugated.

\* \* \* \* \*